United States Patent [19]

Bentley

[11] Patent Number: 4,921,601
[45] Date of Patent: May 1, 1990

[54] COMPONENT PART OF FILTER CASING

[76] Inventor: Bryan R. Bentley, No. 2 Randa Road, Craigavon, Sandton, Transvaal Province, South Africa

[21] Appl. No.: 230,658

[22] Filed: Aug. 10, 1988

Related U.S. Application Data

[63] Continuation of Ser. No. 39,178, Apr. 17, 1987.

[51] Int. Cl.$^5$ ............................................. B01D 35/08
[52] U.S. Cl. .................................. 210/169; 210/232; 210/416.2
[58] Field of Search ............... 210/169, 232, 241, 244, 210/416.2, 441, 454

[56] References Cited

U.S. PATENT DOCUMENTS

| 3,012,676 | 12/1961 | Englesberg | 210/241 |
| 3,592,765 | 8/1969 | Rodriguez | 210/169 |
| 3,767,050 | 10/1973 | Reiner | 210/169 |
| 3,864,262 | 2/1975 | Lang et al. | 210/169 |
| 3,920,352 | 11/1975 | Speck et al. | 210/416.2 |
| 4,657,673 | 4/1987 | Kessler | 210/416.2 |

Primary Examiner—W. Gary Jones
Attorney, Agent, or Firm—Stevens, Davis, Miller & Mosher

[57] ABSTRACT

The invention relates to a component part of a casing for a swimming pool filter. The component part is integral with an outwardly extending flange, the flange having mounting means for mounting accessories to the filter. The component and flange are preferably in the form of an integral moulding or pressing. The component may be hemi-spherical.

8 Claims, 3 Drawing Sheets

COMPONENT PART OF FILTER CASING

This application is a continuation of application Ser. No. 039,178 filed Apr. 17, 1987 now abandoned.

This invention relates to a component part for a filter, more specifically to a component part of a filter for a swimming pool.

According to the invention there is provided in combination, a component part of a casing of a swimming pool filter, and a flange having mounting means for mounting accessories to the filter, the component part and the flange being integral. The component part and the flange may be in the form of an integral moulding, pressing, or the like. The pressing may be a sheet metal pressing, and the 3 moulding may be of synthetic plastics material such as fibre glass.

The component part may be in the form of an upper or lower portion of the filter casing. The component part may be part spherical, to form part of a correspondingly spherical casing. The flange may be arranged to be perpendicular to an axis of the filter, the axis being one which will be vertical in use.

The mounting means may be suitable for mounting a pump, and for an electric motor for the pump.

The invention extends to a filter casing assembly which includes a component part of the filter casing in combination with an outwardly extending flange suitable for mounting accessories to the filter, said combination being integral.

The invention is now described by way of example with reference to the accompanying diagrammatic drawings.

Figure 1:
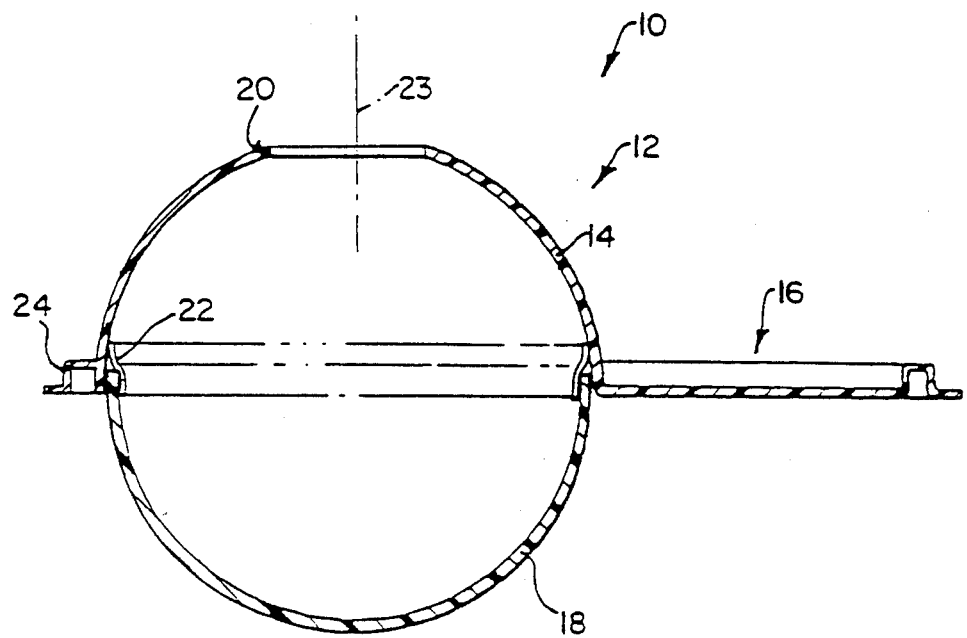
FIG. 1 shows, a sectional side elevation taken at I - I in FIG. 2, of a filter casing assembly in accordance with the invention.
Figure 2:
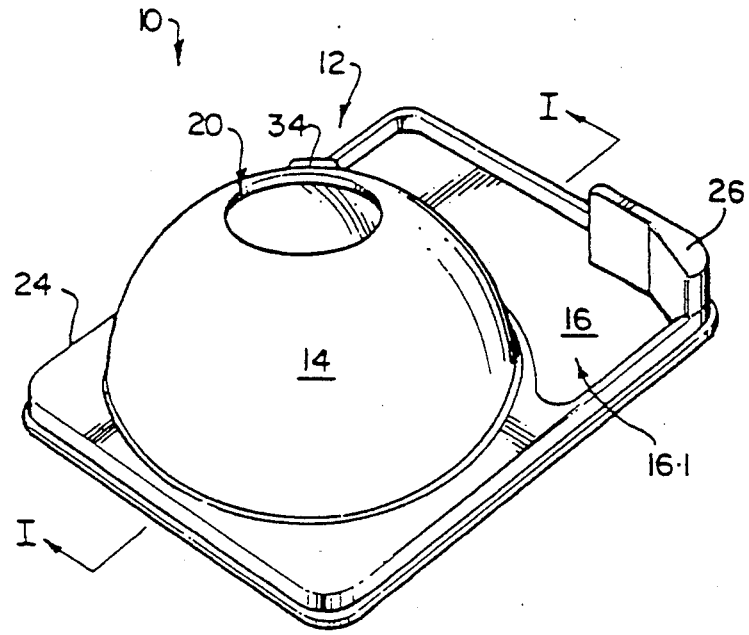
FIG. 2 shows, a three-dimensional view from above and from one side, of the filter casing assembly of FIG. 1.
Figure 3:
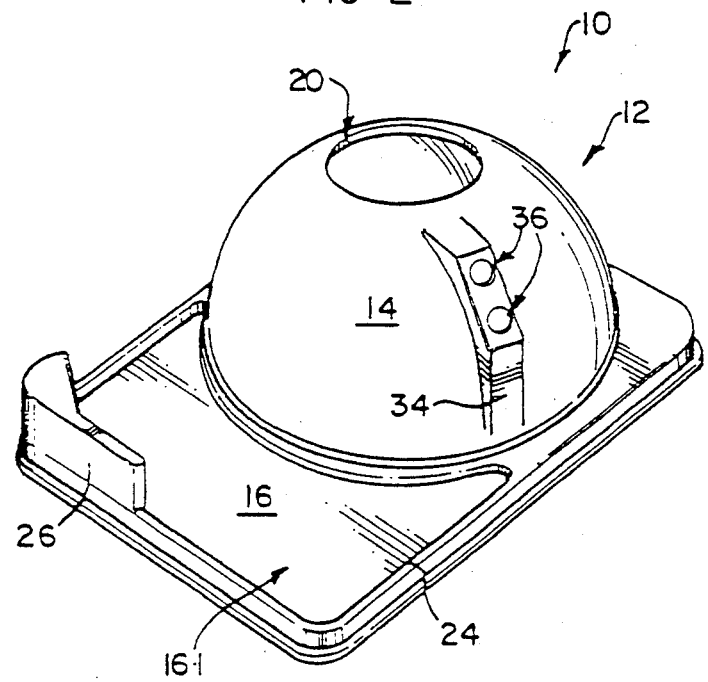
Figure 4:
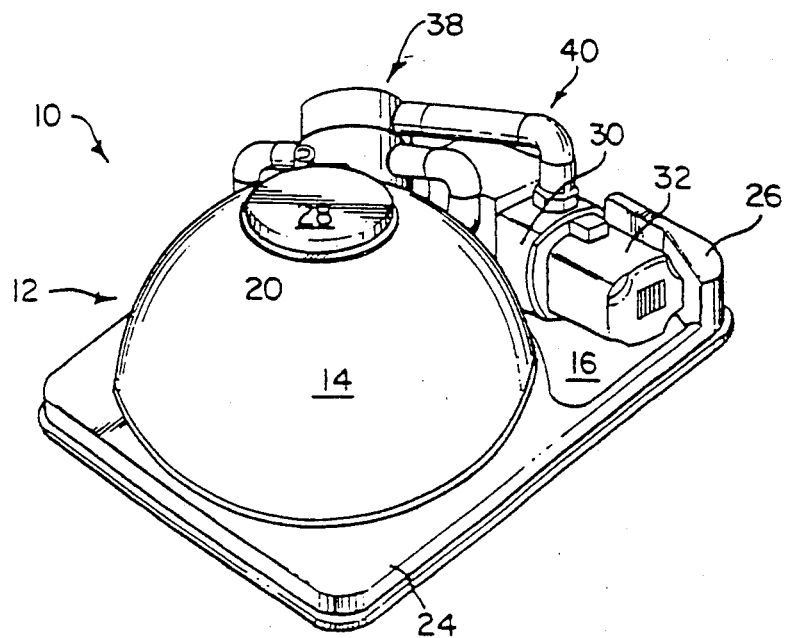
Figure 5:
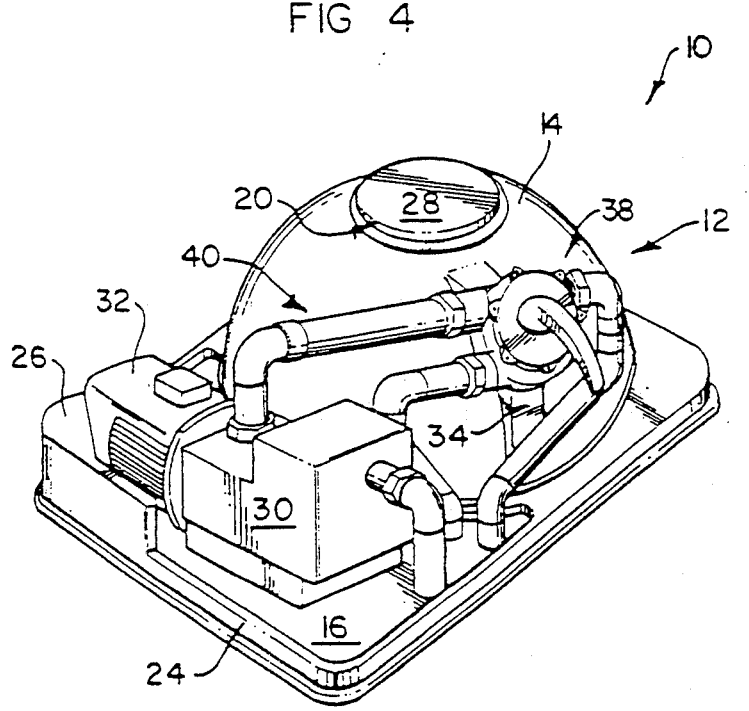

FIG. 3 shows, a three-dimensional view from above and from another side, of the filter casing assembly of FIG. 2; and, FIGS. 4 & 5 correspond respectively to FIGS. 2 & 3 and show accessories to a filter mounted on the filter casing assembly With reference to FIGS. 1, 2 and 3 of the drawings, a filter casing assembly in accordance with the invention is generally indicated by numeral 10. The filter casing assembly 10 comprises the combination of a component part in the form of an upper portion 12 including a hemi-spherical vault 14 and, integral with the vault, an outwardly extending flange in the form of a tray 16. The vault and tray 16, in this embodiment, are a combination in the form of an integral moulding of synthetics plastics material. The assembly 10 further comprises a hemi-spherical casing bed 18 complemental to the vault 14. The vault and the casing bed extends in approximately equal amounts both above and below the flange. The casing bed 18 may have a stand if desired.

The vault 14 and casing bed 18 co-operate to provide a substantially spherical hollow filter casing. The vault 14 and casing bed 18 are equatorially joined together by means of a joining layer 22 applied internally via a mouth 20 in the vault 14. The mouth is concentric with an axis 23 of the filter casing, which will be a vertical axis in use. In other embodiments, joining may be external. When the vault and flange are of sheet metal, joining may be by way of metal welding.

The tray 16 is approximately co-planar with the equator of the casing and is thus perpendicular to said vertical axis.

The tray 16 has mounting means which includes a platform 16.1 to accommodate accessories to a filter of which the filter casing forms part. It has a peripheral rim 24 to enhance its rigidity. At one point the rim 24 is interrupted by a mounting formation 26 also forming part of the mounting means.

On the vault 14, there is provided a chine 34, integral with the rest of the vault 14, and having a pair of holes indicated at 36 which will be inlet and outlet holes for the filter.

With reference to FIGS. 4 and 5, the filter casing assembly 10 is shown equipped with accessories to the filter.

The mouth 20 is covered sealingly by means of a cover 28.

A pump 30 and a pump motor 32 co-axial with the pump 30 and drivingly connected thereto are mounted on the platform 16.1 next to the mounting formation 26.

A valve 38 is mounted on the chine 34. The valve 38 has inlet and outlet ports respectively in communication with the inlet and outlet holes 36. Piping 40 is provided respectively leading to the pump 30, interconnecting the pump 30 and valve 38 and leading from the valve 38.

By way of development, when more than one filter is used in parallel, portions of the various filter casings can be integral with a common flange. Thus, when the filter casings are spherical such as the filter casing illustrated, vaults thereof, can be integral with a common tray.

The Applicant is of the opinion that his invention affords a substantial saving in material compared to other filters having separate filter casings and flanges.

A further advantage is that, during production, one component less needs to be manufactured, because the flange and a portion of the filter casing are integral.

Yet a further advantage is that assembly of a filter assembly is facilitated. It also results in an assembly which is generally neater than similar assemblies having separate filter casings and flanges.

Another advantage is that a filter assembly in accordance with the invention is more rigid and thus stronger than similar filter assemblies having separate flanges.

A further advantage is that a portion of the filter assembly below the flange (i.e. the filter bed 18 in the case of the filter assembly 10 illustrated) can be buried resulting in a lower profile. This has the added advantage that a cover for the filter assembly can be lower, thus utilizing less material, being less expensive, and being less conspicuous.

What I claim as new and desire to secure by Letters Patent is:

1. A filter casing comprising
   two component parts mounted together in a region spaced from both the top and the bottom of the casing;
   one of the component parts including an integral, generally planar support flange extending horizontally outwardly on one side of the casing to form tray means having an upper support surface, said tray means being sufficiently large for supporting accessories including a pump and motor thereon wherein said casing extends in approximately equal amounts both above and below the flange.

2. The filter casing as claimed in claim 1, in which the component part and the flange are made by means of a sheet metal pressing.

3. The filter casing as claimed in claim 1, in which the component part and the flange are of a moulding of synthetic plastic material.

4. The filter casing as claimed in claim 1, in which the component part is an upper or lower portion of the filter casing.

5. The filter casing as claimed in claim 4, in which the component part is shaped to be part-spherical when viewed in elevation, to form part of a correspondingly spherical casing.

6. The filter casing as claimed in claim 5 in which the component part is hemi-spherical.

7. The filter casing as claimed in claim 4, in which the flange is arranged to be perpendicular to an axis of the filter.

8. The filter casing as claimed in claim 7, in which the axis is one which will be vertical in use.

* * * * *